United States Patent [19]

Fuchs

[11] Patent Number: 4,518,940
[45] Date of Patent: May 21, 1985

[54] BACK-BAR ATTACHMENT AND ASSOCIATED FIXTURE

[75] Inventor: Otto Fuchs, Westlake Village, Calif.

[73] Assignee: Burroughs Corporation, Detroit, Mich.

[21] Appl. No.: 299,096

[22] Filed: Sep. 3, 1981

[51] Int. Cl.³ .............................................. H01F 7/20
[52] U.S. Cl. .................................... 335/285; 335/295; 360/125
[58] Field of Search ............... 335/285, 286, 302, 295; 360/125, 126; 79/603

[56] References Cited

U.S. PATENT DOCUMENTS

| 186,755 | 1/1877 | Quimby | 335/285 |
| 2,275,904 | 3/1942 | Howe | 335/285 X |
| 2,784,259 | 3/1957 | Camras | 360/125 X |
| 3,311,711 | 3/1967 | Maryatt et al. | 360/125 |
| 3,341,667 | 9/1967 | Brown et al. | 360/125 |
| 3,882,544 | 5/1975 | Hughes | 360/125 X |
| 4,194,227 | 3/1980 | Kitamura | 29/603 X |

Primary Examiner—George Harris
Attorney, Agent, or Firm—John J. McCormack; Nathan Cass; Kevin R. Peterson

[57] ABSTRACT

Described is a novel method and associated fixture for magnetically attracting and holding back-bar means to respective magnetic core-leg portions of a typical magnetic slider assembly.

19 Claims, 6 Drawing Figures

BACK-BAR ATTACHMENT AND ASSOCIATED FIXTURE

BACKGROUND, FEATURES OF INVENTION

This invention relates to the manufacture of magnetic recording heads and particularly to the attachment of back-bars to core legs therein and to an improved technique therefor and an associated fixture.

Workers in the art of manufacturing magnetic digital recording heads (sliders) for certain digital recording are aware of serious difficulties associated with positioning and attaching magnetic "back-bars" between protruding core legs. It is presently conventional to use spring-applied clamping action; but this is too rough and all too often, and too easily, distorts or snaps-off the core legs (typically a few grams of pressure can do so; and the careless flick of a finger can destroy a leg). This technique requires ultra-careful handling and application of pressure while the clamp is brought into contact—moreover the clamp must be held in place while the adhesive is curing—a very delicate, near-impossible operation unless a large percentage of breakage is to be tolerated (breakage is, of course, very expensive, since the parts themselves have already had a great deal of time and money invested in them).

The present invention eliminates this potentially costly and difficult procedure by substituting a "magnetic fixture" which applies a back-bar-attracting magnetic flux through the magnetic circuit of the core legs themselves and employs magnetic flux (rather than spring tension) to attract and retain the back-bar in place for bonding. As a preferred form, I teach the use of an ordinary U-shaped permanent magnet combined with a "gapped keeper" to project this magnetic flux.

BRIEF DESCRIPTION OF THE DRAWINGS

The foregoing and other features and advantages of the present invention will be appreciated by workers as they become better understood through reference to the following detailed description of presently preferred embodiments which should be considered in conjunction with the accompanying drawings wherein like reference symbols denote like elements.

DESCRIPTION OF PREFERRED EMBODIMENTS

Figure 1:
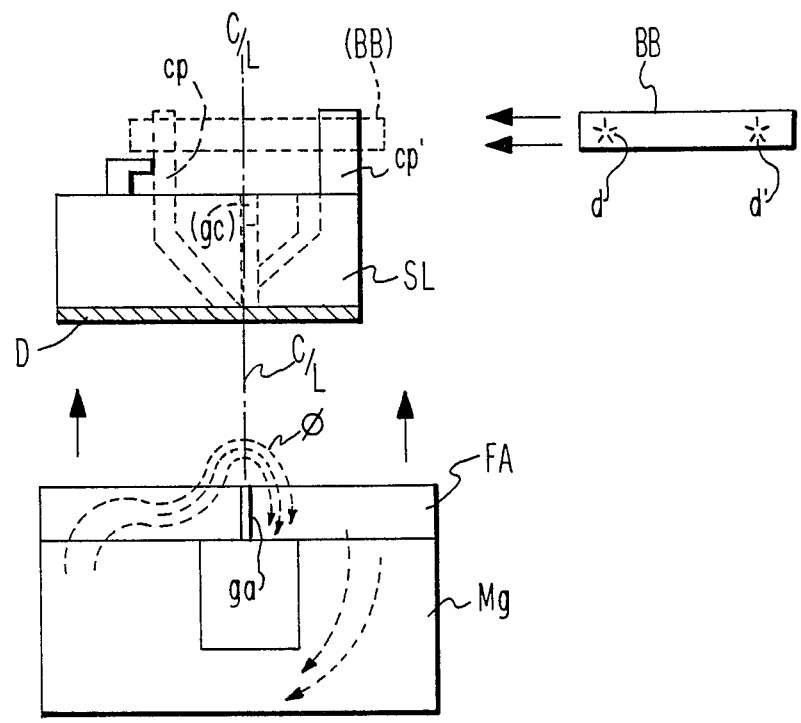
FIG. 1 is a very schematic side view of a "slider" workpiece shown in operative relation with a "back-bar-to-be attached", together with functionally-indicated magnetic flux projecting means according to the subject invention; the slider being shown in plan view in FIG. 1A.
Figure 1A:
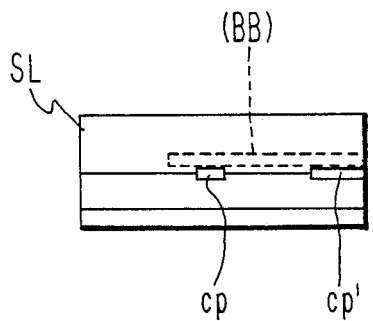

The problem and functional-indication of my solution:

Workers will recognize the rather schematically-shown magnetic recording slider SL in FIG. 1 (plan view in FIG. 1A) as of a type adapted for high performance digital recording, e.g., with floppy disks. Protruding from the slider body are a pair of tiny frangible core legs CP, CP', while convergent portions thereof are shown in phantom within the body of the slider, these being assumed as meeting along a prescribed magnetic center-line CL—CL as is well known in the art (core-gap $g_c$ defines this center line). Workers understand that these core legs are adapted for wrapping with tiny inductor coils and that a magnetic back-bar BB is to be attached between the legs to complete the magnetic circuit being of relatively high reluctance, relatively magnetic (preferably ferrous) material. Back-bar BB must, of course, be carefully brought up into relatively planar contact with both of the core legs CP, CP' and held there while an epoxy, or other bonding material, is cured to complete the permanent connection. In many cases the epoxy or like adhesive material is disposed as a film on one or both of the core legs and at associated attachment sites d, d' on the back-bar BB. Workers will recognize that a great problem exists in the art whereby breakage of the core legs can readily occur unless an extreme, almost unreasonable, degree of care is exercised in carefully bringing back-bar BB into contact with them and retaining it there while the adhesive cures.

The invention solution to this problem, dispensing with such spring-clamping action, is indicated rather schematically by the U-shaped permanent magnet MG and associated flux-focusing "gapped keeper" FA in FIG. 1. It will be remembered that the implementing structure is intended to be applied to slider SL at the face thereof opposite the core legs (adjacent lower core-edge D). These are to be positioned such that the flux emanating from and returning to magnet MG, via keeper FA, will enter slider SL on different respective sides of the magnetic center line CL—CL. Thus, for instance as depicted the exit flux may be applied to only a first core leg CP on one side of gap $g_c$, while the return flux will return only via the other leg CP'. This, of course, assures that a maximum flux is sent to, and through, back-bar BB as it is brought adjacent the projecting ends of these core legs to achieve the inventive results. More particularly, when the slider SL is disposed in an appropriate fixture such as fixture $F_x$ in FIGS. 2 and 3 (e.g., held there by its spring mount as detailed below) and preparatory to attaching back-bar BB, the "magnetic block" MG/FA may be pressed firmly against slider SL (e.g., held in place by a retaining means like clamp RP in FIGS. 2 and 3), so that the external portion of the flux emanating from keeper FA, or a good portion thereof, may be sent up one core leg and returned down the other core leg. Then, when back-bar BB is brought closely adjacent the two core legs, to span the flux path between them and complete their magnetic circuit, as workers in the art will understand, it may be "attached magnetically".

Thus, with the magnetic means FA/MG so pressed against slider SL, an operator may then bring back-bar BB up into reasonable propinquity with the slider legs so that respective portions thereof confront corresponding end-portions of a respective core leg (e.g., site d adjacent the end of leg CP, site d' adjacent the end of leg CP'). Once the back-bar is relatively close to the core legs the magnetic flux can attract it and pull it into relatively intimate contact with the leg ends and retain it there while bonding is effected (e.g., while the customary epoxy is being cured).

This technique takes unusual and inventive advantage of the pre-existing magnetic circuit formed by the core legs and of the low reluctance characteristic of the back-bar, while requiring no particular complexity in tooling means (e.g., essentially just a "magnetic block" as opposed to delicate spring positioning means or the like); it allows one to be relatively casual in positioning the back-bar adjacent the core legs since the flux will pull it into contact through the last several mils or so and retain it there, requiring no springs, no delicate contact, pressure carefully measured, etc.

Workers in the art will appreciate how much less susceptible this technique is to breaking or bending core legs and how relatively more convenient it is, as well as how relatively inexpensive is the fixture therefor (no moving parts, no position determining or translation means, either).

Figure 2:
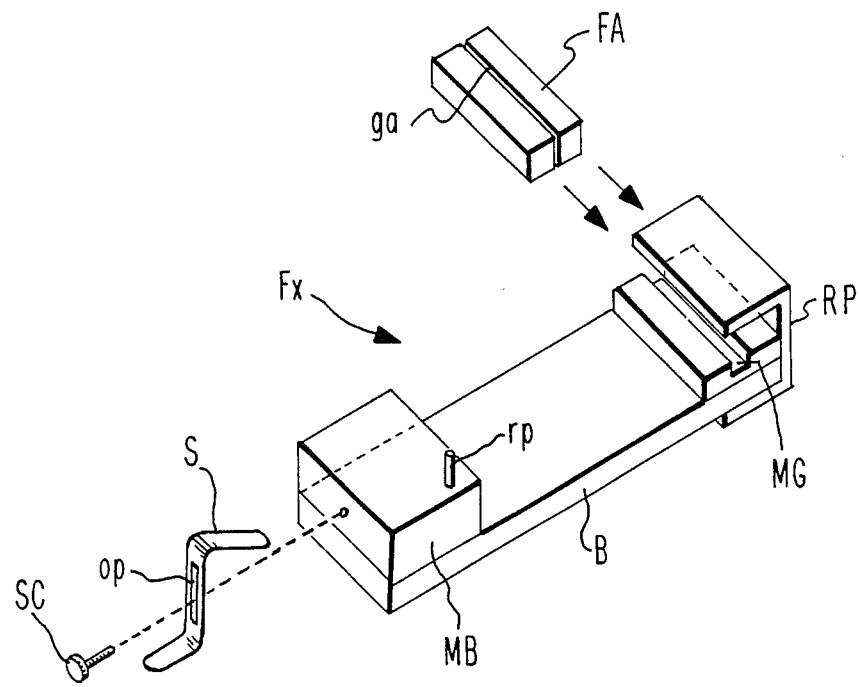
FIG. 2 is an upper perspective.
Figure 3:
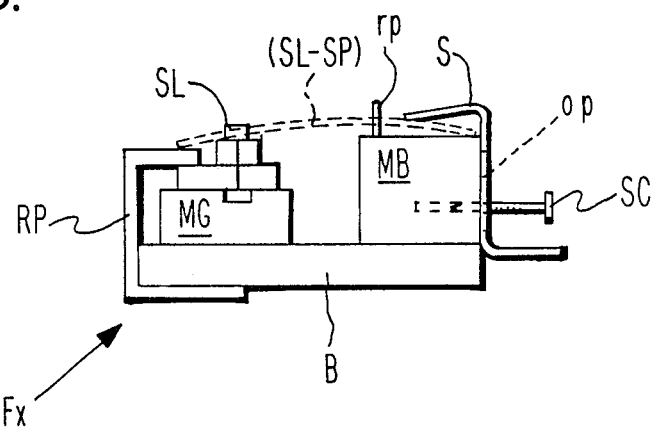
FIG. 3 an elevational view, of one embodiment of a preferred magnetic back-bar attachment fixture embodiment.

Fixture embodiment; FIGS. 2, 3:

A preferred embodiment-fixture for this technique is indicated in FIG. 2 as fixture $F_x$ where a U-shaped permanent magnet MG is affixed on one end of a mounting plate B and adapted to be magnetically coupled to a superposed flux-focusing keeper FA (shown exploded-away for clarity). Magnet MG may be any convenient source of magnetic flux adapted to direct flux up into the slider (gap $g_c$) SL so as to result in alternative flux through core legs CP, CP'. Here, the magnet is U-shaped and directs opposite-polarity flux to legs CP, CP' (with the focus-assistance of keeper FA). Workers will visualize other equivalent arrangements—e.g. one source of unidirectional flux adjacent core-edge D and an oppositely-poled second source of flux adjacent legs CP, CP' (opposite bar BB). Obviously electro-magnet means may be substituted in certain cases (e.g., even another magnetic R/W head possibly!)

Keeper FA could be dispensed with if the flux source could, by itself, project flux properly into slider SL (legs CP, CP' thereof)—e.g., if keeper FA could be magnetized to so direct the required flux by itself. Since the keeper FA only need provide a good low-reluctance flux path to and from slider SL it, should not, by itself, be magnetizable (e.g., so one needn't worry about reversing FA into opposite polarity with MG—workers will know of suitable ferrous keepers; e.g., of soft steel with intermediate gap $g_a$ formed by a brazing nickel alloy bond or the like).

As indicated also in FIG. 3 a U-shaped retaining clamp RP is attached to the end of plate B adjacent magnet MG and adapted to retain keeper FA in good frictional contact with MG (FA may be slid in between MG and the lip of clamp RP and adjusted for registration of its gap $g_a$ with the associated slider gap $g_c$). Fixture $F_x$ is also adapted to retain a slider SL with its gap $g_c$ so registered, being removably attached to the typical spring mount (indicated at mount SL-P).

Figure 4:
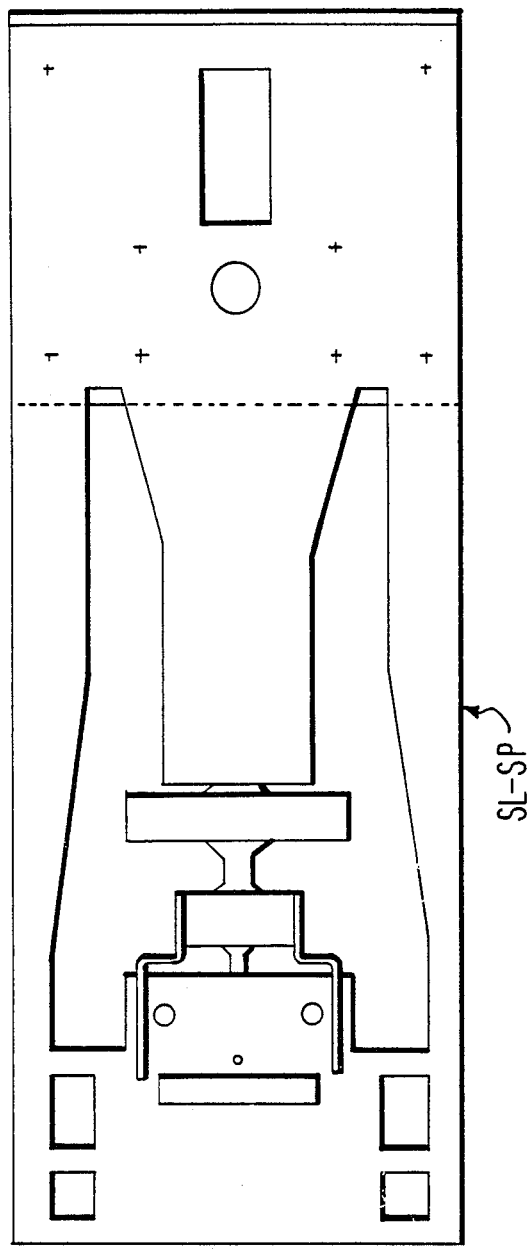
FIGS. 4 and 5 show a typical slider-spring mount in planned elevation views respectively.
Figure 5:
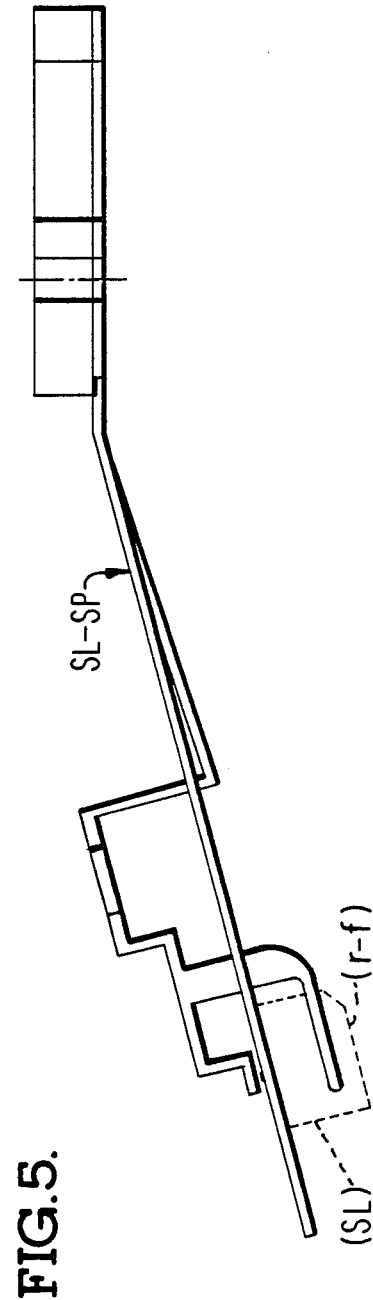

Thus, at the opposite end of plate B a mounting block MB is attached on which the other end of spring SL-SP (see FIGS. 4, 5) may be mounted, position-aligned and retained in a position to best orient slider SL relative to the magnetic keeper FA. While various other retaining means may be used, I prefer to use a relatively simple spring clamp S comprised of flexure spring material (steel) and adapted to be attached, via a clamping slot OP and associated screw, detachably to mounting block MB. Clamp S may be selectively moved up and down, into and out of engagement with the end of slider spring SL-SP, as indicated in FIG. 3 and understood in the art. Alignment means such as pin rp is preferably provided to help properly align the spring and its slider.

Thus, in operation, one may simply insert the keeper bar FA in place over magnet MG and place the slider SL in contact therewith with core legs CP, CP' protruding upward in position for attachment of the back-bar and with core gap $g_c$ registered with keeper gap $g_a$ (just as depicted schematically in FIG. 3; note how the opposing magnetic flux will be directed by non-magnetic gaps $g_c$, $g_a$ to traverse the highly magnetic back-bar workpiece BB, when BB is positioned between core legs cp, cp' of slider SL, holding it in place magnetically until it is bonded there). The opposite end of the slider spring SL-SP is positioned atop mounting block MB, being registered as pin rp, then clamp S is depressed onto the end thereof to retain it during back-bar attachment.

Now, using tweezers or any other convenient tool, one may simply grip the associated back-bar (e.g., pre-coated with epoxy or like adhesive preferably) and bring it up adjacent core legs CP, CP'—so that its ends lie adjacent the contact points of the respective ends of the core legs—whereupon the magnetic flux will pull the back-bar into good contact with the legs and hold it there so bonding may proceed (e.g., by next touching the pieces with a bead of epoxy, as well known in the art). The structure may be left until the adhesive is cured (or alternatively heat applied as necessary, since the fixture can be made to survive the temperatures and atmosphere of a curing oven if necessary). With back-bar attachment complete, the workpiece may be removed simply by displacing clamp-spring S.

Results:

As suggested above, excellent results have been achieved with surprising ease and with very little "scrap".

Alternative techniques, structure:

This method (and fixture) may also be used for other workpieces where tiny frangible magnetic parts are to be bonded together.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other like slider structures and with other like fixtures. Also, the present invention is applicable for coupling magnetic parts on other like structures.

The above examples of possible variations of the present invention are merely illustrative. Accordingly, the present invention is to be considered as including all possible modifications and variations coming within the scope of the invention as defined by the appended claims.

What is claimed is:

1. A fixture for attaching a back-bar means to core legs of a magnetic recording slider assembly comprising:
   magnetic block means adapted to project a prescribed magnetic flux through said core legs to attract and hold said back-bar means;
   plus means for holding said slider registered with said block means.

2. The combination recited in claim 1, wherein said block means comprises a magnetic flux source including a prescribed gap on a contact face thereof adapted to be registered between said core leg paths.

3. The combination recited in claim 2, wherein said holding means comprises spring means for detachably aligning and holding the slider.

4. The combination recited in claim 2, wherein said magnetic block means comprises a permanent U-shaped magnet means adapted for focusing said flux at the gap between said core legs.

5. The combination recited in claim 4, wherein said magnetic means comprises a U-shaped permanent magnet together with an associated "gapped-keeper means" adapted to focus the flux from said permanent magnet up through said respective core legs.

6. The combination recited in claim 5, wherein said keeper means is comprised of a pair of low reluctance, relatively non-magnetizable, portions joined by a relatively non-magnetic gap material.

7. The combination recited in claim 6, wherein said holding means comprises spring means for detachably aligning and holding the slider.

8. In a fixture for attaching magnetic part means to a magnetic recording slider including a prescribed non-magnetic gap zone, the slider including first post means disposed on one side of said gap zone and second post means on the other side of said gap zone, the improvement combined therewith comprising:

magnetic flux source means;

holder means constructed and arranged to receive and hold said slider and said source means in prescribed relative position whereby the magnetic flux from the source means is directed in "opposed-pole fashion" with the flux entering the slider on one side of said gap zone and returning from the slider on the other side of the gap zone such that when the magnetic means is presented in magnetic contact with, and between, said post means, it is held firmly in position by the flux from said source means.

9. The combination as recited in claim 8 wherein said source means includes a magnet structure and flux-director means disposed between the magnet structure and the slider, being constructed and arranged to direct the flux from magnet structure and slider in such "opposed-pole" fashion.

10. The combination as recited in claim 9 wherein the flux-director means comprises a block of low-reluctance "keeper" material split by a high-reluctance, relatively non-magnetic gap zone.

11. The combination as recited in claim 10 wherein the holder means includes means for retaining the slider aligned with said director means so the respective gaps register.

12. The combination as recited in claim 11 wherein said magnetic flux source means includes a prescribed gap on a contact face thereof, this gap being registered with said gaps of the slider and director means.

13. The combination as recited in claim 12 wherein the slider post means comprise core legs and the magnetic means comprises a back-bar means to be bonded between the core legs, while so retained there by the flux, the source means and director means being adapted to project a prescribed magnetic flux through said core legs to attract and hold said back-bar means.

14. The combination as recited in claim 13 wherein said holder means includes spring means for detachably aligning and holding the slider.

15. The combination as recited in claim 14 wherein said magnetic source means comprises a permanent U-shaped magnet means and associated "gapped-keeper" constructed and arranged to focus said flux at the slider gap between said core legs.

16. The combination as recited in claim 15 wherein said keeper is comprised of a pair of low-reluctance, relatively non-magnetizable, portions joined by relatively non-magnetic gap material.

17. The combination as recited in claim 16 wherein said holder means comprises means for detachably aligning and holding the slider spring means.

18. The combination as recited in claim 8 wherein said post means comprise the low-reluctance core legs of a magnetic read/write slider and said magnetic means comprises an associated back-bar constructed and arranged to be susceptible to such magnetic attraction and bonding.

19. The combination as recited in claim 8 wherein said source means includes a magnet structure and flux-director means disposed between the magnet structure and the slider, being constructed and arranged to direct the flux from magnet structure and slider in such "opposed-pole" fashion; and wherein the flux-director means comprises a block of low-reluctance "keeper" material split by a high-reluctance, relatively, non-magnetic gap zone; and wherein said slider legs are disposed within the slider to provide separate flux paths across the slider cross section;

and wherein said magnetic source means presents opposing flux on either side of the gap zone of said director, this gap zone being registered along the slider gap between said core leg flux paths to provide opposing flux separately to said core legs.

* * * * *